March 26, 1968
D. SELWYN
3,374,845
COMMAND CONTROL SYSTEM FOR VEHICLES
Filed May 5, 1966
4 Sheets-Sheet 1
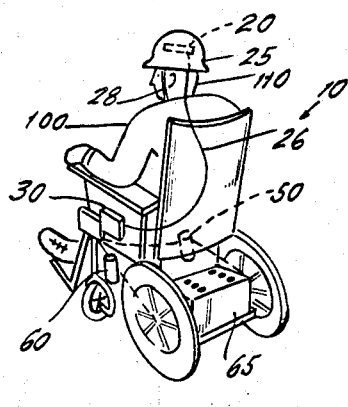
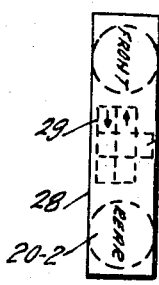
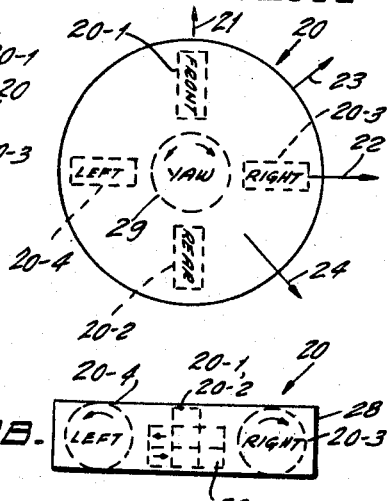
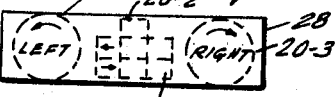
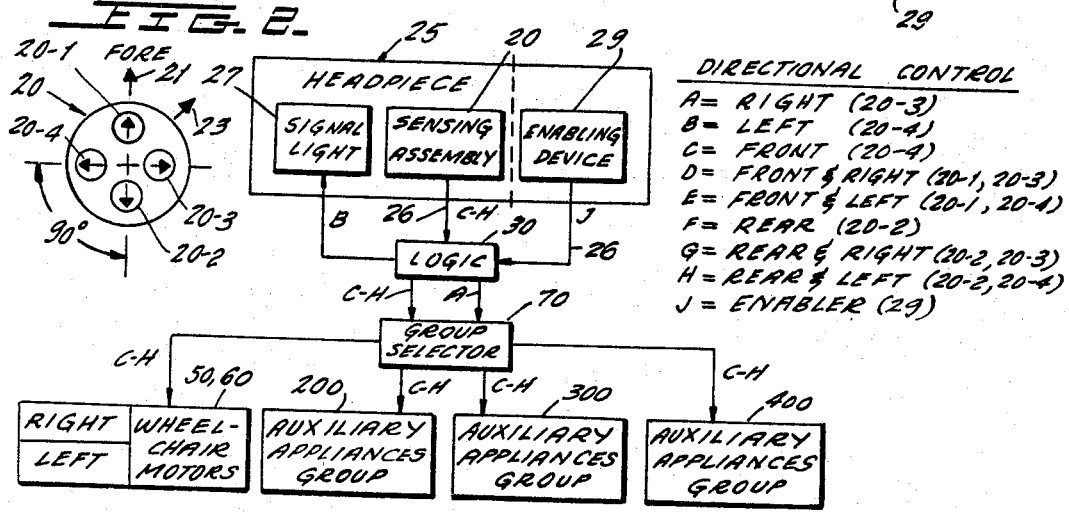
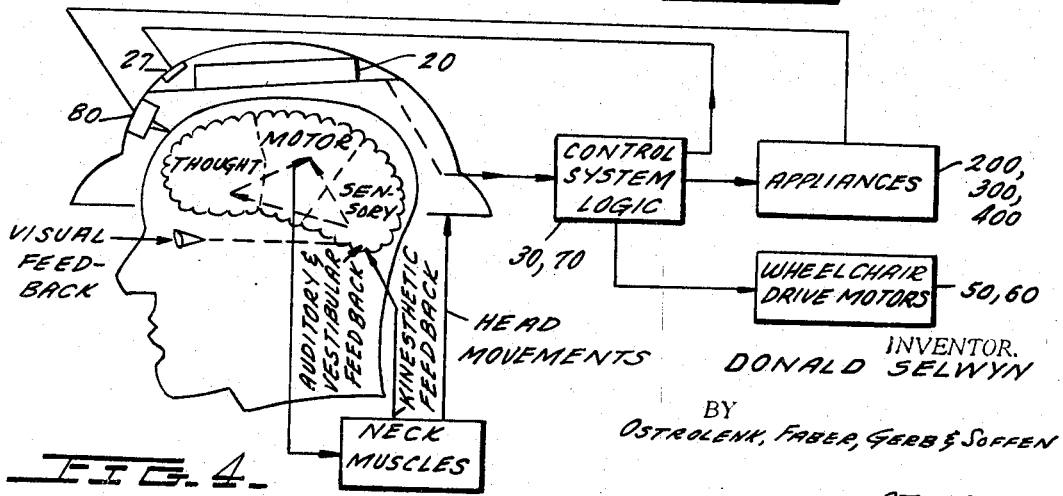
INVENTOR.
DONALD SELWYN
BY
OSTROLENK, FABER, GERB & SOFFEN
ATTORNEYS

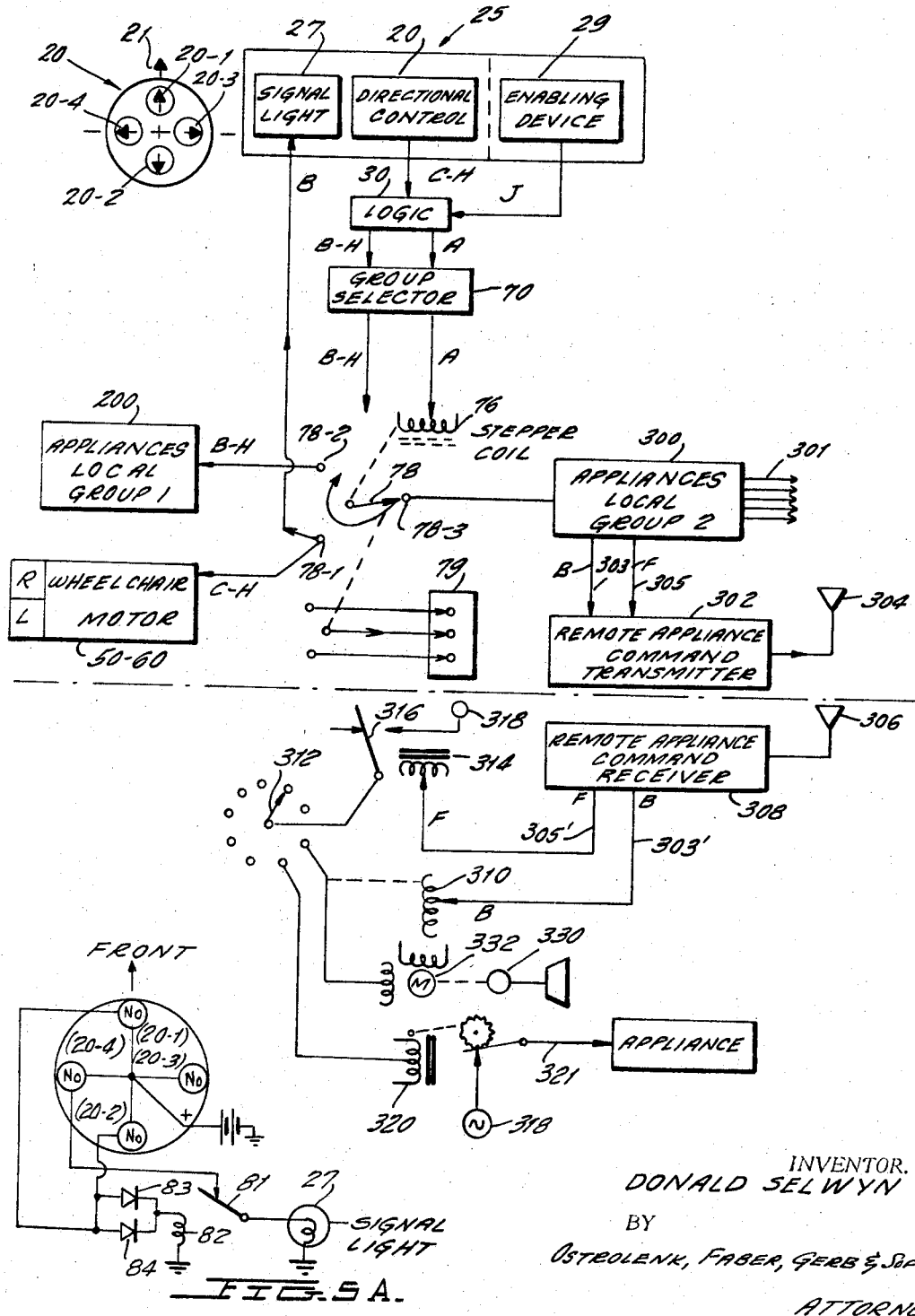

March 26, 1968     D. SELWYN     3,374,845
COMMAND CONTROL SYSTEM FOR VEHICLES
Filed May 5, 1966     4 Sheets-Sheet 4
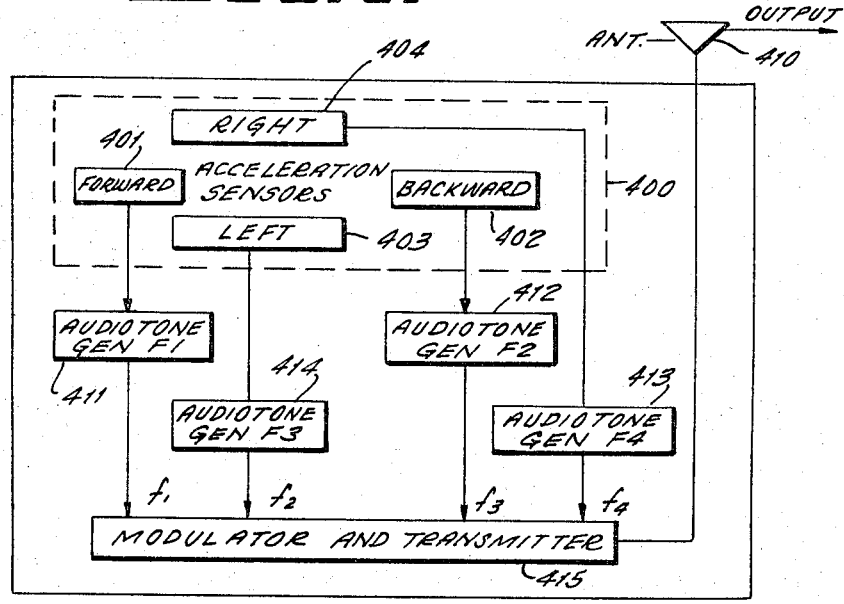
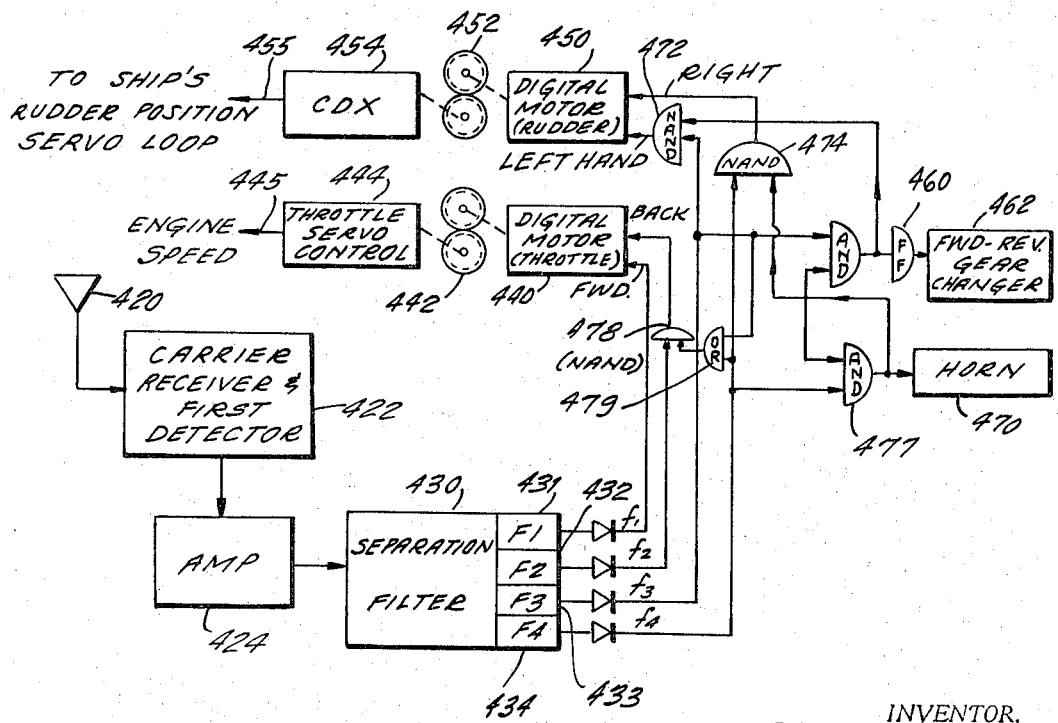
INVENTOR.
DONALD SELWYN
BY
OSTROLENK, FABER, GERB & SOFFEN
ATTORNEYS

# United States Patent Office 3,374,845
Patented Mar. 26, 1968

3,374,845
COMMAND CONTROL SYSTEM FOR VEHICLES
Donald Selwyn, 238 Poplar Ave.,
Pompton Lakes, N.J. 07442
Filed May 5, 1966, Ser. No. 547,832
18 Claims. (Cl. 180—6.5)

My invention relates to a command control system, in which a multiplicity of functions are controlled in accordance with the movement of the operator's body in selectively determined directions. In a more particular aspect thereof, the command control signals are originated within a sensing assembly mounted to the head of the user, such that the user can controllingly command a plurality of functions by moving his head.

Situations are being encountered where a human operator, because of physical incapacity, environmental confinement or otherwise must rely on a portion of his body, other than his hands or feet, for controlling a variety of functions. As, for example, it is desired that a quadriplegic having normal head mobility be able to drive himself about in a motorized wheelchair and operate various appliances necessary for normal day-to-day living. At present such unfortunate people must have a steady attendant to convey them from place to place and to assist them in pursuing their life's desires. Because of the economics and other practical considerations, this has severely limited the independence of these individuals and has substantially relegated them to institutional confinement.

In accordance with one form of my invention, I provide a head-mounted servo control system in which the handicapped individual, by selective movement of his head, can command the operation of a motorized wheelchair, as well as various other appliances (e.g. tape recorder, signal light, book page turning device, radio, television, etc.). More specifically, the head-mounted device worn by the user may be in the form of a helmet or eyeglass frame containing a sensing assembly for responding to the different components of movement of the user's head. The sensing assembly provides an output signal in accordance with the particular directional components of movement of the user's head. This output signal is, in turn, presented to a logic circuit which processes the sensing assembly response and provides various command control signals for performing the multiplicity of desired functions. As, for example, the system may be designed such that movement of his head in one direction (e.g., forward) moves the wheelchair forward, and rearward movement of the head moves the wheelchair backwards. Further, the logic circuit is so designed that movement of the head in intermediate directions will permit the wheelchair to move backwards or forwards, turning to either the right or the lefthand direction.

In accordance with a particularly advantageous aspect of my invention, movement of the user's head in another direction may serve to control the functions of other operators for the user's convenience. As for example, a signal light, tape recorder or automatic page turning device may be provided at the wheelchair. In addition, other operators, such as a radio, television or room-light controls may be provided remote from the wheelchair, and under the command control of the instant system.

In accordance with a particularly advantageous embodiment of my invention, the multi-function means controlled by the command signal output of the logic circuit are divided into groups. A first of these groups may provide the various control signals for operation of the wheelchair drive motors. A second or subsequent ones of these groups provide the various other functions controlled by the system. Movement of the user's head in a particular one of the switching directions serves to automatically step between control groups. The subsequent movement of the user's head in the other available switching directions then serves to operate a particular function within the selected group. By virtue of the group control switching concept, the user may rapidly command a great number of functions, substantially in excess of the degrees of head movement, without requiring the time-consuming and bothersome necessity of sequentially stepping through each and every individual control function.

In addition to assisting the physically handicapped, the broad concepts of my invention are likewise adaptable to various other control systems; as for example, the remote control of boats, aircraft, and space vehicles. This allows the operator to control one or more vehicles, vessels or aircraft, while having the utilization of his hands, feet and eyes for other tasks.

It is therefore seen that the basic concept of my invention resides in the provision of a control system including a sensing assembly mounted to a portion of the user's body, such as the head, and responsive to the different components of movement of the user's body for generating command signals which control a multiplicity of functions in accordance with intentional body movement.

It is therefore a primary object of my invention to provide a command control system which permits a user to controllingly operate a multiplicity of external equipment or equipment functions in accordance with selective movement of his body.

A further object of my invention is to provide such a command control system which is mounted to the user's head, and which operates in accordance with the directional components of pre-defined patterns of head movement.

Another object of my invention is to provide a motorized wheelchair for a quadriplegic which includes a sensing assembly mounted to the user's head, and capable of generating command signals in accordance with head movements, a logic circuit for receiving the sensing assembly command signals, and generating a plurality of output motor control signals operatively related thereto, and a multi-function means including drive motors, for moving the wheelchair.

An additional object of my invention is to provide such a motorized wheelchair device, which further includes means for permitting the user's head movement to control a plurality of additional functional operators, some of which may be remote from the wheelchair.

Still a further object of my invention is to provide a command control system in which the plurality of functions controlled thereby are separated into groups, with selection between the groups being achieved by movement of a user's head in one of the switching directions, and the actuation of a particular operator within the selected group being achieved by movement of the user's head in another one of the available switching directions.

Still another object of my invention is to provide such a command control system, responsive to movement of the user's head, which is safe, dependable in operation and may be easily detached from the user's body.

These as well as other objects of my invention will become readily apparent upon a consideration of the following descriptions and drawings in which:

FIG. 1 is a perspective view showing one form of my invention which includes a motorized wheelchair as the controlled device.

FIG. 2 is a simplified block schematic demonstrating the operation of the command control wheelchair device shown in FIG. 1.

FIGS. 3A, 3B and 3C are top, rear and left-side views respectively of one form of a head-mounted sensing assembly, which may be used in conjunction with my invention.

FIG. 4 represents the bio-electronic servo system for demonstrating the psycho-physiological basis of my invention.

Figure 5:
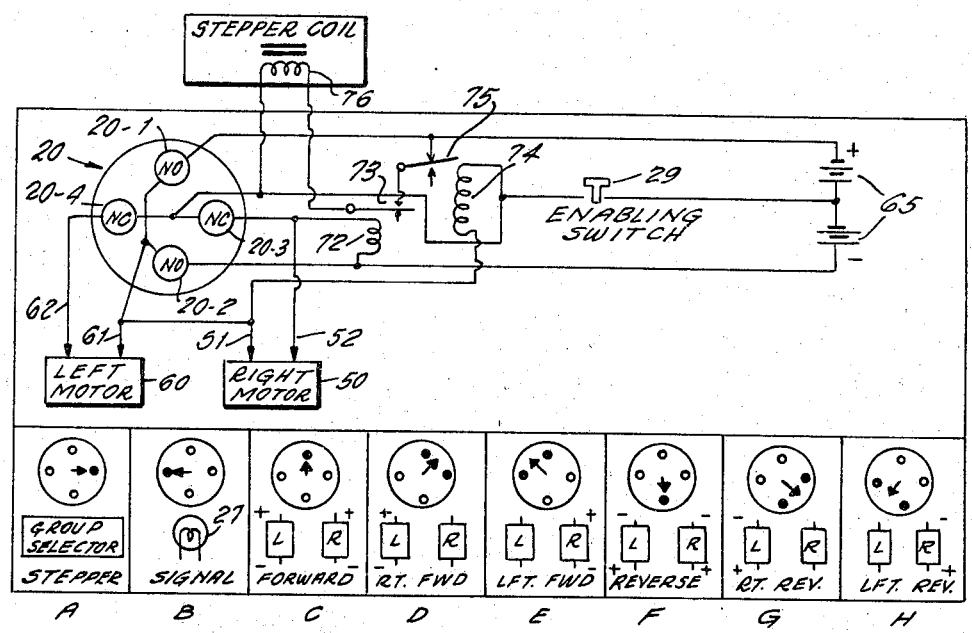

FIG. 5 schematically shows one form of logic which may be used.

FIG. 5A is a simplified schematic showing the manner in which a signal light may be energized.

Figure 6:
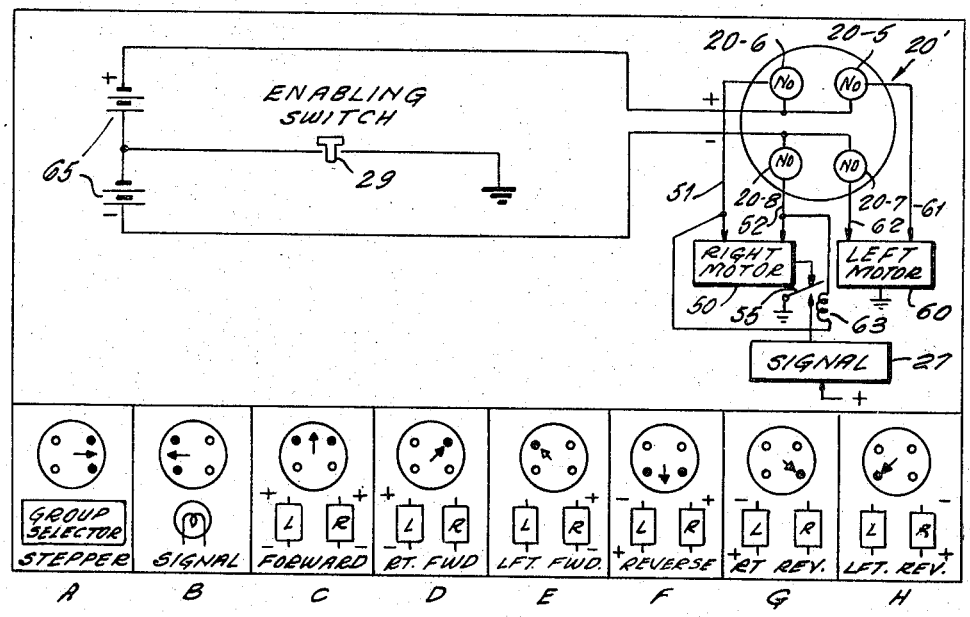

FIG. 6 schematically shows an alernative form of logic which may be employed.

FIG. 7 schematically shows the more general application of my invention, illustrating both the group switching concept and the control of remotely located appliances.

FIG. 8 shows in block diagram another embodiment of my invention for the remote control of a boat.

Reference is initially made to FIG. 1, which shows one form of my invention, including provision for controlling the operation of a motor-driven wheelchair 10. The user or operator 100 seated within the wheelchair is, in this case, a quadriplegic, having no use of his arms and legs, but having complete mobility of his head 110. The nature of such head movement is sensed by sensing assembly 20, which serves to initiate a plurality of command control signals, for controlling the movement of the wheelchair, as well as other functions. Sensing assembly 20 (as shown in FIGS. 3A–3C) may include individual transducers responsive to the directional components of head movement. Such transducers may typically be gravity actuated switches, which provide either an ON-OFF or a proportional output signal. Sensing assembly 20 is carried by a housing structure, typically shown in the form of a hat 25, to be worn on the user's head. Alternatively, where such a hat might be inconvenient or otherwise undesirable, the individual transducers of the sensing assembly 20 may be of a presently available miniaturized variety, mounted within an eyeglass frame. The wheelchair also carries a signal processing logic circuit, generally shown as 30, the input of which receives the output sensing assembly signal via connection 26. Logic circuit 30 provides a plurality of control signals to wheelchair drive motors 50, 60, to provide controlled operation thereof. A power source is shown provided by rechargeable battery assembly 65.

As will be henceforth described in further detail, the directional components of the user's head movement are sensed by sensing assembly 20, which provides an operatively related input command signal to the logic circuit 30. Logic circuit 30 appropriately processes this command signal and provides output control signals to the wheelchair drive motors 50, 60, such that the direction of movement of the user's head ultimately serves to actuate drive motors 50, 60 and govern the movement of the wheelchair 10.

In order to prevent incidental or inadvertent movement of the user's head from actuating drive motors 50, 60, the control system includes an ON-OFF enabling device responsive to a predetermined head movement above a specific magnitude. As, for example, an enabling switch of the microswitch variety may be provided which is operated by the chin strap 28 of the hat 25, such that the user can turn the control system between ON and OFF conditions by fully opening his mouth. Alternatively, the sensing assembly 20 may include a yaw accelerometer having a narrow operating range such that it is only responsive to a turning of the head that is neither too fast nor too slow. As another alternative, a voice operated switch may be provided, responsive to a predetermined sequence of sounds. Further, the enabling may be provided by selecting one or all the sensors to respond only to movements of a magnitude or rate above a preset threshold virtue.

Reference is now made to FIG. 2, which shows in simplified block diagrammatic form one type of control system which may be utilized in conjunction with my invention. The headpiece 25 contains the sensing assembly 20, as well as enabling device 29, and in this particular embodiment a signal light 27. The sensing assembly 20 includes four individual directional sensors 20–1, 20–2, 20–3, and 20–4, each responsive to a component of movement, in the direction of their respective arrows. Hence, movement of the head in the forward direction, indicated by arrow 21, will actuate sensor 20–1, while movement of the rear will actuate sensor 20–2. The sensor acceptance angles are selected such that movement in an intermediate direction, as shown by arrow 23, will simultaneously actuate adjacent sensors 20–1 and 20–3. It should thus be apparent that the sensing assembly 20 has capability for providing eight output signals, corresponding to the actuation of individual ones of the sensors; or a pair of adjacently disposed sensors, individually responsive to transverse components of movement. In addition, a ninth signal may be provided by enabling device 29, which as noted above may typically be a switch 29 connected to the user's chin strap 28. Where a bidirectional enabling device is employed (e.g., yaw sensor responsive to head rotation in the right or left hand direction), a ninth and tenth command signal is thereby provided.

For convenience of discussion, the respective output signals from the head piece are designated as follows:

| Signal Designation | Head Movement | Sensor Actuation |
|---|---|---|
| A | Right | (20-3) |
| B | Left | (20-4) |
| C | Front | (20-1) |
| D | Front and Right | (20-1, 20-3) |
| E | Front and Left | (20-1, 20-4) |
| F | Rear | (20-2) |
| G | Rear and Right | (20-2, 20-3) |
| H | Rear and Left | (20-2, 20-4) |
| J | Enabler | (29) |

The output signals A–J from the user's headpiece 25 are then presented via conductor 26 to the logic circuit 30. In the particular arrangement of individual sensors as shown by assembly 20, a subtractive logic system, of the type shown in FIGURE 5 is used. Alternatively, additive logic as shown in FIG. 6 may be employed. The particular control system utilized preferably categorizes the various functions controllable by the operator in accordance with groups. The control of the wheelchair motors 50, 60 is shown as a first group, and the numerical designations 200, 300, 400 generally indicate other appliance groups.

The logic circuit 30 provides a plurality of output control signals in accordance with the particular directional movement of the user's head. These output control signals are either presented to the wheelchair motors 50, 60 or the particular appliance group selected by the group selector 70. Stepping of the group selector to the various groups is provided by movement of the user's head in one of its directions, as for example to the right, providing signal designation A. When the group selected corresponds to the actuation of the wheelchair motors, the movement of the user's head, as represented by the signals C–H, will then generate the appropriate signals for controlled movement of the wheelchair. As an additional feature, I also provide a signal light 27 in the headpiece 25, which is in the same logic group as the wheelchair motors, and may be actuated by movement; for example, to the left (signal designation B).

When the user has moved his wheelchair to his desired location, he may then step the group selector 70 to the desired appliance group and actuate individual additional operators, either at the wheelchair (e.g., tape recorder, page turning device, etc.) or remote therefrom (radio, television, room-lights, air conditioner, etc.). After the desired additional functional operators are actuated, with the wheelchair being in the desired location, the user may then prevent inadvertent movement of its head from further actuating the control system by operating the enabling device 29, which typically disconnects the source of power from the control switching system. However, this will not automatically discontinue operation of the additional function, which may be locked in the actuated condition until a subsequent OFF signal is provided, as will be discussed in conjunction with FIG. 8.

It should naturally be understood that the above-discussed embodiment is typical of many such arrangements which may be practiced within the general concepts of my invention. As, for example, substantial simplification can be obtained when it is only desired that the user operate the wheelchair drive motors 50, 60, without the additional appliance groups indicated by 200, 300, 400, in which case the group selector 70 may be omitted. In this case, the A signal may be used to control another function at the wheelchair.

Reference is now made to FIGS. 3A, 3B and 3C which show a typical sensing assembly 20, having four individual sensors 20–1, 20–2, 20–3, 20–4, and an enabling device in the form of yaw sensor 29. Each of the sensors 20–1 . . . 20–4 may typically be a mercury actuated, uni-directional single pole switch. Alternatively, the four sensors may be replaced by a pair of bi-directional mercury switches, or where desired, proportional control switches of the electrolytic variety. The individual sensors are contained within a generally disc-shaped housing 28 of a convenient size to be located within a hat, as shown in FIG. 1.

Although each of the sensors are generally shown as sensitive to movement in a single direction, they must preferably have a fairly broad acceptance angle. That is, should the user move his head directly forward, as indicated by the arrow 21, sensor 20–1 will be actuated. Similarly, if the user moves his head directly to the right, indicated by the arrow 22, sensor 20–3 will be actuated. If, however, the operator nods his head intermediate these directions, as indicated by the arrow 23, there will be directional components of movement in both the directions of arrows 21 and 22; and it is desired that simultaneous outputs be received from both sensors 20–1 and 20–3. Likewise, should the operator move his head in the direction of arrow 24, it is desired that simultaneous outputs be received from sensors 20–3 and 20–2. Thus, in accordance with the particular subtractive logic arrangement utilized, it is required that each of the four sensors 20–1 . . . 20–4 have an acceptance angle in excess of 90°. Typically, the acceptance angle of the individual sensors 20–1 . . . 20–4 should be within the range of 95°–150°, with 110°–120° having demonstrated particularly advantageous results.

FIG. 4 represents a bio-electronic servo system, showing the manner in which the user serves to complete the closed servo feedback loop. The sensor assembly 20 built into the headpiece 25 measures the result of neck muscle movement. Motor commands from the user's brain travel to the neck muscles, causing head movement, the directional components of which are determined by the individual sensors 20–1 . . . 20–4 of sensing assembly 20 (or the yaw detector in the case of initially enabling the control system). The sensors are appropriately designed to discriminate between deliberate command movement of the head and other movements, such as lesser magnitude reflux actions. The user, by means of kinesthetic feedback from the neck muscles, is able to sense the directional orientation of his head with such sensing being contributed to further by the vestibular sense, auditory feedback and visual feedback. It is noted that the motor area of the brain which generates the commands going to the neck muscles and causing head movement is influenced by two major routes. Oversimplifying the psychodynamics, the longer and slower route is the conscious command route—the route from the eyes or other feedback sensors through the conscious thought areas of the brain to the motor areas. This path would be used during the normal driving of the motorized wheelchair, such as when the operator judges his distance from the point where he would like to stop and knowing from past experience he will consciously give the stop command signal at the right time. A much more rapid path is the reflex route, running directly from the sensory part of the brain to the motor area, without going through the thought area. This signal path would automatically come into play should, for example, somebody suddenly walk in front of the wheelchair while it is moving. If the operator is sufficiently experienced, he would react instantaneously in the same manner as an automobile driver who tends to apply the brakes as a reflex action. In addition to the above-noted physiological feedback paths, artificial feedback to the operator from one or more of the appliances may be provided by a stimulating transducer 80, incorporated within the headpiece 25. Transducer 80 may, for example, be a tactile stimulator, which provides a vibrating, shocking or pricking signal to the user. Its stimulus may be digital in nature, as with discrete indentations, or it might be proportional, with the strength of the feedback signal being operatively related to the appliance condition.

Reference is now made to FIG. 5, which shows in simplified form subtractive logic arrangements that may be used in conjunction with the drive motor actuation for the wheelchair embodiment. Diagrammatic signal conditions A–H at the lower portion of this figure correspond to similarly designated signals of FIG. 2, with the arrows showing the direction of head movement and the darkened dots showing the individual sensors actuated by the directional components of head movement. It is noted that front and rear sensors 20–1 and 20–2 are of the normally opened type, while right and left sensors 20–3 and 20–4 are normally closed. It should naturally be understood that this represents a simplified schematic, with the actual circuitry including relays or semiconductor devices between the individual sensors and the remainder of the circuit, such as motors 50, 60. These relays advantageously avoid the necessity of passing the high motor current through the head-mounted inertial sensors and permit the use of sensors having normally open contacts. Also, for purposes of simplifying the discussion, a continuous mode of operation is shown, which would require that the operator keep his head tilted at all times (with gravity sensors), in accordance with the particular drive signals that are being transmitted to the wheelchair drive motors 50, 60. By means of appropriate logic, an intermittent mode of operation can be used in which a purposeful nod of the user's head in the particular direction actuates the desired drive motors, and such motors continue to operate until another purposeful nod of the head cancels the action or re-programs the control system for a different one of its various functions. The intermittent mode of operation preferably allows the operator to move his head freely after giving the initial command, with the sensors having appropriate threshold values to avoid actuation by movement other than the user's purposeful nod.

Motors 50 and 60 are designed, such that a positive potential at terminals 51 or 61 thereof drives the motor forward, while a negative potential at these terminals drives the motor in the reverse direction. The opposite terminals of the motors 52, 62 respectively are connected to the circuit common connection to which the center tap of battery 65 is also connected. Enabling switch 29 is series-connected intermediate the common return of the battery energization system 65, and the control system, to effect turning thereof between the ON and OFF conditions. Relays 72, 74, 76 are part of the group selector circuitry for sequentially stepping between the different functional groups, with the condition shown in FIG. 4 corresponding to the selection of the wheelchair drive group.

Movement of the user's head forward will actuate normally open sensor 20–1 such that it will close. This completes the circuit from the positive battery potential to both leads 51 and 61 of both motors, thereby driving both motors 50 and 60 simultaneously to move the wheelchair forward. Conversely, should the user move his head to the rear, the contacts of sensor 20–1 return to their normally open condition, while the contacts of 20–2 will close. This will cause the negative potential of battery source 60 to be simultaneously applied to leads 51, 61 of both motors, thereby simultaneously driving both motors in the opposite direction to move the wheelchair backward. If the user nods his head approximately 45° to the right of forward, as shown by signal condition D, normally opened contacts of 20–1 close, and simultaneously the normally closed contacts of 20–3 open. The open contacts of sensor 20–3 break the common path to the right-hand motor 50, so that this motor will not drive even should the positive battery potential be applied thereto from closed sensor 20–1. The net result is that the right motor and the wheel do not turn while the left motor is forwardly actuated, thereby pivoting the wheelchair about the stationary right wheel. Should the user move his head forward to the left, corresponding to switch condition E, right hand motor 50 is forwardly actuated, while the return to left motor 60 is interrupted by the opening of sensor 20–4, thereby pivoting the wheelchair forward about the stationary left wheel. In a similar manner the rearward movement of the head, shown by the signal conditions G and signal condition H, serve to turn the wheelchair rearward to the right and left respectively.

Considering now the operation of the stepping coil 76, it is noted that when normally closed sensor 20–3 is actuated, relay 72 is de-energized, causing its normally open contact pair 73, through which the stepping coil current passes, to close. However, the path to stepper coil 76 may be interrupted by the opening of contacts 75 of relay 74, which is energized should either of sensors 20–1 or 20–2 also be actuated. That is, relay 74 serves an interlocking function to prevent the actuation of stepping coil 76, unless all of sensors 20–1, 20–2, 20–3 are in their open condition. This condition occurs only with head movement directly to the user's right.

In actual practice sensors 20–3 and 20–4 may be of the normally open variety, with the inverse operation shown in FIGURE 5 being accomplished through the use of inverse sensor relays (not shown). In such an arrangement, the signal light 27 as shown in simplified FIG. 5A is connected directly to the sensors, bypassing the inverse sensor relays. A nod directly to the left closes sensor 20–4 to energize signal light 27 through contact 81 of non-energized relay 82. Should the head be nodded forward-left or backward-left, one of sensors 20–1 or 20–2 will also close, providing energization to relay coil 82, via semi-conductor devices 83 or 84, thereby opening contact 81 and preventing energization of signal light 27. Thus, the signal light will only be energized when the head is nodded directly to the left.

FIGURE 6 shows an alternative logic arrangement utilizing an additive logic approach, wherein the sensing assembly 20' includes four individual sensors 20–5, 20–6, 20–7 and 20–8 all normally open. It is noted that in the additive logic arrangement the individual sensors are shifted 45° relative to the subtractive logic arrangement. The individual signal conditions A–H correspond to the similar designations of FIGS. 2 and 5 respectively, with the actuated sensors being shown by the darkened circles. When the headpiece is moved forward, corresponding to signal condition C, normally opened sensors 20–5 and 20–6 simultaneously close, so as to cause positive battery potential to be applied to terminals 51 and 61 of both the right and left motors. Both motors are returned to the common battery ground, causing them to rotate in the forward direction. Should the user move his head to the rear, corresponding to switch condition F, sensors 20–7 and 20–8 close simultaneously, applying negative battery potential, the motor terminals 52, 62, thereby causing the motors to rotate in the reverse direction. Tilting of the head rearward to the left (switch condition H) causes the contacts of sensor 20–7 to return to their normally opened position, while the contacts of sensor 20–8 remain closed. Thus, the right motor 50 will continue to rotate backwards, while motor 60 is de-activated, thereby causing the wheelchair to pivot to the operator's left in a rearward direction. It should likewise be readily apparent that movement of the head to the various switch conditions D, E and G serves to actuate the respective motors as diagrammatically shown in the switch condition boxes. Should the operator move his head directly to the left, it is necessary to prevent the inadvertent application of both positive and negative potential to the right-hand motor 50. This is provided by relay 63 connected across the outputs of sensors 20–6 and 20–8, to disconnect the ground return 55 of motor 50. This relay also operates signal light 27, upon a direct left command movement. Similarly, a relay may be provided across the left motor 60, so as to automatically disconnect that motor whenever simultaneously right outputs should appear from either sensors 20–5, 20–7.

Reference is now made to FIG. 7, which schematically shows further details of the control system in conjunction with functional operators and terminal appliances other than the wheelchair drive motor, and showing the group switching concept for facilitating the selection and control of these additional functions. To further demonstrate the versatility of the instant invention, these additional functions are shown as both being local to the user and remote therefrom, with the latter being interlinked to the user by virtue of a wireless connection. The particular system shown in FIG. 7 is a subtractive logic arrangement, corresponding generally to that shown in FIGS. 3 and 5, with the signal designations A–H corresponding to similarly designated signal conditions of these previously discussed figures. Further, those portions of the control system corresponding to that shown in the more simplified FIGS. 2 and 5, are indicated by like numerals. Briefly reviewing, it is recalled that after the enabling switch 29 is moved to the ON condition, the movement of the head-worn housing structure 25 in a particular one of its directions (e.g., to the right) provides one of its output signal indications (the A signal) which operates the stepper coil 76 for selecting the particular group of functions to be controlled. Movement of the head-worn housing structure 25 in the other command directions generates any one of the other command signals (B–H) for selecting the individual functional operator within the selected group. The actuation of stepper coil 76 serves to move common contact 78 thereof between its group selection positions typically shown as 78–1, 78–2, and 78–3. It should naturally be understood that three such positions are shown for exemplary purposes only, and more or less positions may be provided in accordance with the number of functions which must be controlled by the operator. However, a practical limit may be imposed so as to avoid the need for the operator to nod his head an excessive number of times. Advantageously, a visual display 79 is also provided so as to immediately indicate to the operator the particular group under his control.

When the common contact 78 of the group selector switch is in the position indicated by 78–1, the motorized wheelchair is under the operator's control and this corresponds to the condition shown in FIG. 5. Movement to the next functional group, indicated by 78–2, serves to disconnect the wheelchair drive motor from the logic circuit output command signals, and connects such signals B–H to the local appliance group designated 200. This local appliance group may typically include a tape recorder, page turning machine, etc.

When the operator then actuates the group selector 70 one more time, the stepper switch contact 78 is moved to the position indicated by 78–3, such that the logic output command signals B–H are then presented to the appliance group indicated by the numerals 300. While a number of the command signals presented thereto may be utilized to control local functions, as indicated by the signals 301, two of the command signals presented to this group, illustratively shown as the B and F signals, are used to control remotely situated functional operators. These two signals, indicated as 303, 305, are presented to a transmitter 302, having an antenna 304, for sending the command signal to a remote location whereat it is received by antenna 306 connected to remote receiver 308. The link between transmitter 302 and 308 is preferably wireless and the means of transmission may typically be radio, sonar or optical coupling. The receipt of signal 303 at the receiver, indicated by 303', serves to actuate the stepper switch 310, which controls common contact 312 for selecting the particular function to be controlled. After this selection, the signal 305 is transmitted, which is received by transmitter 308 and provides an output signal 305' for actuating relay 314, relay 314 has normally open contact 316 connected to the power source 318. Thus, the actuation of relay 314 serves to apply power to the previously selected appliance.

Advantageously, the actuation of relay 314 does not permanently apply power to the selected appliance, but impulses a relay locally at the appliance, typically shown by 320. Relay 320 may be a ratchet type relay connected in series with the A.C. source 318, with the output signal 321 thereof being applied to the particular appliance or function desired to be actuated by the operator. Thus, the selected appliance will remain on, although the relays 310 and 314 are subsequently de-energized. With this arrangement, each appliance is independently controlled.

Some functions to be controlled by the operator may require a proportional control rather than an ON-OFF control; for example, a radio or television would require an adjustment of volume. This volume control is shown typically by volume control 330 operated by motor 332. More specifically, one of the control functions selected by stepper relay 310 serves to turn on the radio; with the radio then being turned on, the user may adjust the volume by stepping to the position corresponding to the actuation of motor 332, and motor 332 remains energized by the user until he obtains the desired volume.

Thus, the arrangement shown in FIG. 7, by allowing the user to control a number of functions remote from his particular location, permits the handicapped individual to live an independent and self-supporting life, without requiring the continual presence of an attendant to care for his everyday needs.

In the system of FIGURE 7, each of the remote functions are sequentially selected, requiring that the radio link handle only two of the command signals. Where increased selection speed is required, as in FIGURE 8, the plurality of command signals (e.g., seven in number) may be transmitted to the remote location, permitting the instantaneous control of a multi-function remote appliance.

While the previous discussion has been principally concerned with the adaptation of my control system for permitting a handicapped individual to control a motorized wheelchair as well as a variety of other functions both local and remote to the wheelchair, the broad aspects of the invention are likewise adaptable to various other environments. As, for example, the system may be used for controlling various other vehicles, such as a boat, aircraft, or space ship where the operator because of involvement in other duties would be desirous of controlling the multiplicity of functions in accordance with his head movement. In high-speed vehicles, where acceleration errors and change of attitude would make gravity type sensors impractical, rate of turn sensors (e.g., single degree of freedom gyros) or accelerometers may be employed for the individual sensors within the overall sensing assembly. As representative of such additional applications, FIG. 8 shows a parallel, multi-function wireless system for the control of a boat. This would permit the captain to sit on deck, or move to any location of the boat which would give him a good view of floating debris, reefs, sandbars, pilings or other obstacles in the water, all the while maintaining the boat under his instantaneous command. Further, the operator would not be confined to the wheel of the ship and could spend time socializing with others aboard the ship, all the while maintaining an operative link with the ship's throttle and rudder control. The basic command signals are originated within the sensor assembly 400, carried by a housing structure adapted to be worn on the head of the user, such as a helmet or eyeglass frame. Sensor assembly 400 includes a plurality of individual sensors 401, 402, 403, 404, which are typically accelerometers having appropriate threshold values, such that they will only respond when subjected to an acceleration along their specified input axes, that exceed a predetermined minimum. This predetermined minimum is established at a value of sufficient magnitude such that normal head movement for maneuvers of the boat will not cause unwanted control signals to the boat operating controls. Sensors 401–404 are connected to respective tone-generators 411–414, each selected to provide a distinctly different frequency output when subjected to an impulse signal. That is, the actuation of individual ones of the respective sensors 401–404 provides a pulse output therefrom, which is applied to the respective tone generator and produces an output pulse of the tone generator frequency. The tone generator output pulses are applied to a modulator and transmitter 415, which suitably modulates the pulses (as by A.M., F.M., S.S.B., or phase modulation) onto a carrier wave and presents it to antenna 410 to provide an output signal to the boat controls. The modulated signal from antenna 410 is received at antenna 420, wherein it is routed to a carrier receiver and first detector stage 422. After detection the signals are fed through amplifier 424 of sufficiently broad band width to accommodate any of the frequencies that might be present as a result of the actuation of the sensor assembly 400. The signals are then passed to a filter network 430, wherein individual filters 431, 432, 433, and 434 separate the pulses into their respective individual command signals $f_1$, $f_2$, $f_3$ and $f_4$.

The pulse signals from the headpiece forward and backward sensors at frequencies $f_1$ and $f_2$ are applied to digital motor 440. Inasmuch as a boat need not require continuous speed control, the throttle digital motor 440 may be designed to provide rather large increments of movement, responsive to a pulse input. As, for example, the motor 440 and associated gearing 442 may be designed such that each input pulse will increase the throttle setting by 25%. Advantageously, movement between the forward and reverse directions is provided by a gear changer 462, which is actuated by flip-flop 460, in a manner which will henceforth be discussed. Such a gear changer as well as a throttle servo control 444 would normally already be included in a boat equipped with a marine auto-pilot. In such a boat the control system of the instant invention may function as a manual over-ride for the auto-pilot system.

The actuation of sensors 403 or 404 provide output pulses $F_3$ and $F_4$ for ship rudder control. These signals are presented to digital motor 450 via NOT AND circuits 472, 474, the purpose of which will be subsequently discussed. The output of rudder control digital motor 450 is presented through gearing assembly 452, to one of the elements (the rotor or stator) of synchro data control transformer 454, or alternately the ball-bearing potentiometer shaft in the auto-pilot system, and is then presented as signal 455 to the ship's rudder position servo loop.

Referring back to the forward-reverse functions, it is recalled that flip-flop 460 is provided to actuate forward-reverse gear changer 462. In the illustrative system, this reversal of propeller rotation is achieved by having the operator nod diagonally backward to the left, so as to actuate sensors 402, 403. Both of these pulses appear simultaneously to AND gate 476. This causes AND gate 476 to impulse flip-flop 460, changing its output state. This, in turn, operates the forward-reverse gear changer 462. It is noted that if either the $f_2$ or $f_3$ pulse is applied to the AND gate 476 alone, there will be no output change. Thus, the direction of the boat can change only when both the $f_2$ and $f_3$ signals simultaneously appear, and this will only occur with a rearward to the left movement of the operator's head of a sufficient magnitude to overcome the preset threshold bias of the individual sensor devices.

The actuation of horn 470 requires that the operator move his head backward and to the right, thereby simultaneously actuating sensor means 402, 404. This, in turn, provides a simultaneous $f_2$ and $f_4$ signal to AND gate 477, which in turn provides a pulse input to the horn 470. The horn is appropriately designed to give one blast of predetermined extent each time it is triggered by a momentary pulse. NOT AND gates 472, 474 and 478 and OR gates 479 are provided to prevent interaction from the gear change and horn functions into the rudder and throttle control functions. It is noted that the backward throttle control signal $f_2$ must pass through NOT AND gate 478; thus, if signal $f_2$ is present by itself, it will advance the signal motor one step, retarding the throttle. However, when this signal $f_2$ is received in conjunction with either a left signal $f_3$ or a right signal $f_4$, one or the other of these additional signals pass through the OR gate 479, to NOT AND gate 478. Hence, if the $f_2$ signal is present with either the $f_3$ or $f_4$ signals, the NOT AND gate 478 passes neither signal and the throttle is not actuated. The actuation of the rudder, each time a horn blast or forward reverse gear changer signal is received, is prevented by directly passing the outputs from the gear change and horn AND gates 476, 477 to rudder NOT AND gates 472, 474 respectively. Thus, the $f_3$ and $f_4$ signals to the rudder motor will be blocked at the NOT AND gates whenever an $f_2$ backward signal is simultaneously present.

It is therefore seen that my invention provides a command control system responsive to movement of the operator's body in predetermined directions, with such command control system demonstrating extreme versatility in adaptation to numerous environments and control functions.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

1. A multi-function control system for generating a plurality of distinct control signals responsive to the components of movement of a user's body in selectively determined command directions, comprising:
   a housing structure having means for attachment to a user's body;
   a sensing assembly carried by said housing structure;
   said sensing assembly including sensing means for responding to the different components of movement of said housing structure, and providing output command signals operatively related to the particular directional components of movement of said housing structure;
   a logic circuit including an input, signal processing means, and an output;
   said sensing means output signals connected to the input of said logic circuit;
   said signal processing means providing an output logic signal in accordance with the particular sensing means command signals presented to said logic circuit;
   means for performing a multiplicity of functions operatively connected to the output of said logic circuit;
   said output logic signal providing a plurality of control signals for controlling the operation of said multi-function means in a selectively determined manner, such that the direction of movement of said housing structure allows the user to selectively control the operation of said multi-function means by his body movement.

2. In a multi-function control system, as recited in claim 1:
   said sensing means including first, second, third and fourth individual sensors;
   said first sensor positioned in said housing structure to respond to movement thereof in a first direction only;
   said second sensor positioned in said housing structure to respond to movement thereof in a second direction only, generally opposite to said first direction;
   said third sensor positioned in said housing structure to respond to movement thereof in a third direction only, transverse to said first and second directions;
   said fourth sensor positioned in said housing structure to respond to movement thereof in a fourth direction only, generally opposite to said third direction.

3. In a multi-function control system, as recited in claim 2:
   said housing structure being of a form to be worn on the user's head so as to respond to the directional components of head movement in said first, second, third and fourth directions.

4. In a multi-function control system, as recited in claim 2:
   the movement of said housing structure in respective ones of said first, second, third and fourth directions, actuating the respective individual sensors responsive to such component of movement, for providing an individual one of a first, second, third and fourth sensor output signal to said logic circuit input;
   said logic circuit signal processing means responding to the particular sensor signal for providing an individual one of a first, second, third and fourth control signal to said multi-function means.

5. In a multi-function control system, as recited in claim 2:
   the movement of said housing structure in respective ones of said first, second, third and fourth directions, actuating the respective individual sensors responsive to such component of movement, for providing an individual one of a first, second, third and fourth sensor output signal to said logic circuit input;
   the movement of said housing structure in a direction intermediate transversely responsive ones of said sensors simultaneously actuating said transversely responsive sensors to simultaneously provide their sensor output signals to said logic circuit input connections;
   said logic circuit signal processing means responding to the particular sensor signals for providing an individual one of a first, second, third and fourth command control signal to said multi-function means corresponding to the actuation of an individual one of said sensors, and at least one additional control signal corresponding to the simultaneous actuation of a particular pair of said transversely responsive sensors.

6. In a multi-function control system, as set forth in claim 1:
   said housing structure being of a form to be worn on the user's head so as to respond to the directional components of head movement;
   said multi-function means including a motor-driven wheelchair having first and second drive motors;
   said sensing means providing a plurality of output command signals responsive to the user's head movement in distinctly different first, second, third and fourth directions;

said logic circuit providing at least first, second, third, four, fifth and sixth output control signals responsive to the presentation thereto of respective ones of said sensing means output signals;

means operatively connecting said output control signals to said drive motor, such that said first output control signal actuates said first and second drive motor in a first direction for moving said wheelchair forward;

said second output control signal actuates said first and second drive motors in a second direction for moving said wheelchair backward;

said third output control signal actuates said first drive motor in said first direction while said second drive motor is de-energized, for turning said wheel chair forward to the right;

said fourth output control signal actuating said first drive motor in said second direction while said second drive motor is de-energized for turning said wheelchair backward to the right;

said fifth output control signal actuating said second drive motor in said first direction while said first drive motor is de-energized for turning said wheelchair forward to the left, and said sixth output control signal actuating said second drive motor in said second direction while said first drive motor is de-energized for turning said wheelchair backward to the left.

7. In a multi-function control system, as set forth in claim 6:

said control system having an OFF condition in which the system is deactivated and the multi-function means is non-responsive to the user's head movement, and an ON condition in which the selective movement of the user's head provides command signals for operating said multifunction means;

system enabling means for switching between said ON and OFF conditions;

said system enabling means carried by said housing structure and responsive to predetermined movement thereof.

8. In a multi-function control system, as recited in claim 3:

said control system having an OFF condition in which the system is deactivated and the multi-function means is non-responsive to the user's head movement, and an ON condition in which the selective movement of the user's head provides command signals for operating said multi-function means;

system enabling means for switching between said ON and OFF conditions;

said system enabling means carried by said housing structure and responsive to predetermined movement thereof.

9. In a multi-function control system, as recited in claim 3:

said individual sensors being gravity actuated devices, disposed in said sensing assembly such that the sensor acceptance range of individual ones of said devices is orientated in said first, second, third and fourth directions.

10. In a multi-function control system, as recited in claim 8:

said system enabling means being an acceleration responsive device responsive to movement other than in one of said first, second, third and fourth directions.

11. In a multi-function control system, as recited in claim 3:

said multi-function means including a plurality of operators, at least one of which is capable of generating a feedback signal in accordance with its instantaneous condition;

means for establishing a feedback responsive stimulus within said housing structure for indicating the condition of said one operator to the user.

12. In a multi-function control system, as recited in claim 1:

said multi-function means including at least a first and second group, each having a plurality of individual operators for performing a similar plurality of discrete functions;

movement of said housing structure in one of its directions presenting one of the sensing means output command signals to said logic circuit input;

said one signal serving to select a particular one of said groups;

movement of said housing structure in other of its directions presenting other output signals to said logic circuit input;

said other signals serving to select a particular operator within the group preselected by said one signal.

13. In a multi-function control system, as recited in claim 3:

said multi-function means including at least a first and second group, each having a plurality of individual operators for performing a similar plurality of discrete functions;

movement of said head-worn housing structure in one of its directions presenting one of the sensing means output signals to said logic circuit input;

said one signal serving to select a particular one of said groups;

movement of said head-worn housing structure in other of its directions presenting other output signals to said logic circuit input;

said other signals serving to select a particular operator within the group preselected by said one signal.

14. In a multi-function control system, as recited in claim 1:

said multi-function means including a plurality of operators, at least some of which are located remote from the user;

said logic circuit including means for transmitting said control signals to said remote location;

receiver means at said remote location for receiving said control signals and presenting said control signals to the selected operator.

15. In a multi-function control system, as set forth in claim 6:

said logic circuit further providing a seventh output control signal;

said seventh output control signal controlling additional operators of said multi-function means other than said drive motors;

at least one of said additional operators located remote from said wheelchair;

said logic circuit including means for transmitting said control signals to said remote location;

receiver means at said remote location for receiving said control signal and presenting it to the selected operator.

16. In a multi-function control system, as set forth in claim 15:

said multi-function means including at least a first and second group, each having a plurality of individual operators for performing a similar plurality of discrete functions;

said drive motor control operators contained within said first group and said additional operators contained within said second group;

said seventh output signal providing switching between said groups such that when said first group is selected the other command signals provided by said sensing means output signals provide selective actuation of said drive motors for controlled movement of the wheelchair, and when said second group is selected said other command signals generated by said sensing means output signals provide selective actuation of said additional operators.

17. In a multi-function control system as set forth in claim 8:
said system enabling means providing by the threshold response of at least one of said individual sensors, such that magnitude of movement above a pre-set minimum is required to obtain such senor response.

18. In a multi-function control system, as recited in claim 1:
said multi-function means including a plurality of operators, at least some of which are located remote from the user;
said logic circuit including means for transmitting certain ones of said command signals to said remote location;
receiver means at said remote location for receiving said last-mentioned command signals and presenting same to a selection means for selecting the desired operator and presenting a control signal thereto.

References Cited

UNITED STATES PATENTS

| | | | |
|---|---|---|---|
| 2,742,735 | 4/1956 | Sommerhoff | 318—16 X |
| 2,754,497 | 7/1956 | Wolpert | 340—279 |
| 2,999,232 | 9/1961 | Wilson | 340—279 |
| 3,100,860 | 8/1963 | Rosenthal | 180—6.5 X |
| 3,106,371 | 10/1963 | Brannin et al. | 244—83 |
| 3,208,062 | 9/1965 | Gregory | 340—279 |

KENNETH H. BETTS, *Primary Examiner.*